United States Patent
Wehner

(10) Patent No.: US 7,055,307 B2
(45) Date of Patent: Jun. 6, 2006

(54) VECTORABLE NOZZLE WITH SIDEWAYS PIVOTABLE RAMP

(75) Inventor: Edward James Wehner, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 90 days.

(21) Appl. No.: 10/930,881

(22) Filed: Aug. 31, 2004

(65) Prior Publication Data

US 2006/0042230 A1 Mar. 2, 2006

(51) Int. Cl.
*F02K 1/00* (2006.01)

(52) U.S. Cl. .................. 60/232; 60/770; 239/265.19

(58) Field of Classification Search .............. 60/228, 60/230, 232, 770, 771; 239/265.19, 235.35
See application file for complete search history.

(56) References Cited

U.S. PATENT DOCUMENTS

| | | | | |
|---|---|---|---|---|
| 3,096,049 A | * | 7/1963 | Karasinski | ............. 244/52 |
| 4,023,105 A | * | 5/1977 | Woolling, Jr. | ......... 340/825.26 |
| 4,110,972 A | * | 9/1978 | Young et al. | ............. 60/230 |
| 4,280,660 A | * | 7/1981 | Wooten et al. | ........ 239/265.35 |
| 4,641,782 A | * | 2/1987 | Woodward | ........... 239/265.29 |
| 4,747,543 A | * | 5/1988 | Madden | ................ 239/127.3 |
| 4,801,087 A | * | 1/1989 | Woodard | ............... 239/127.1 |
| 4,848,664 A | * | 7/1989 | Thayer | ................. 239/265.29 |
| 4,978,071 A | * | 12/1990 | MacLean et al. | ...... 239/265.19 |
| 5,016,818 A | * | 5/1991 | Nash et al. | ............ 239/127.1 |
| 5,050,803 A | * | 9/1991 | Wakeman et al. | .... 239/265.35 |
| 5,082,181 A | * | 1/1992 | Brees et al. | ........... 239/265.35 |
| 5,092,524 A | | 3/1992 | Garrett et al. | |
| 5,142,862 A | * | 9/1992 | Brown | ................. 60/226.2 |
| 5,261,604 A | * | 11/1993 | Meyer | ................ 239/265.19 |
| 5,294,055 A | | 3/1994 | Garrett et al. | |
| 5,335,489 A | * | 8/1994 | Thayer | ................. 60/230 |
| 5,431,344 A | * | 7/1995 | Novotny et al. | ....... 239/265.35 |
| 5,437,412 A | * | 8/1995 | Carletti | ............ 239/265.25 |
| 5,511,376 A | * | 4/1996 | Barcza | ................. 60/230 |
| 5,833,139 A | * | 11/1998 | Sondee et al. | ........ 239/265.17 |
| 6,857,600 B1 | * | 2/2005 | Walker et al. | ........... 244/73 R |
| 6,948,317 B1 | * | 9/2005 | Renggli et al. | .............. 60/771 |
| 2003/0145599 A1 | * | 8/2003 | Renggli et al. | .............. 60/771 |

* cited by examiner

*Primary Examiner*—William H. Rodriguez
(74) *Attorney, Agent, or Firm*—William Scott Andes; Steven J. Rosen

(57) ABSTRACT

A vectorable nozzle includes a longitudinally extending upper fixed wall spaced upwardly and aftwardly of a longitudinally extending lower fixed wall and an aftwardly swept fixed ramp extending between the upper and lower fixed walls. The upper and lower fixed walls and the fixed ramp extend transversely between first and second fixed sidewalls. An outer nozzle wall is spaced apart from the upper and lower fixed walls and extends transversely between first and second fixed sidewalls. A nozzle flowpath is defined between the upper and lower fixed walls and the outer nozzle wall and the first and second fixed sidewalls. A sideways pivotable ramp structure pivotally connected to the lower fixed wall and pivotable between the sidewalls includes a longitudinally extending upper pivotable wall spaced upwardly and aftwardly of a longitudinally extending lower pivotable wall and an aftwardly swept pivotable ramp extending between the upper and lower pivotable walls.

26 Claims, 5 Drawing Sheets

VECTORABLE NOZZLE WITH SIDEWAYS PIVOTABLE RAMP

BACKGROUND OF THE INVENTION

Field of the Invention

The invention relates to aircraft gas turbine engine two dimensional vectoring nozzles and, more particularly, for such nozzles designed to shift center of nozzle exhaust flow sideways to effect vectoring.

Aircraft designers and particularly those designing high speed highly maneuverable military aircraft are constantly seeking better ways for controlling the aircraft and increasing its maneuverability in flight. These are needed for anti-aircraft missile avoidance and other combat maneuvers. Additionally, aircraft designers are trying to improve short take off and landing capabilities of aircraft. Exhaust systems, particularly for modern, high speed, military aircraft, have been adapted to provide a high degree of maneuverability over a wide variety of flight conditions including altitude, speed and Mach number while maintaining cruise efficiency.

Aircraft maneuverability may be provided by aircraft control surfaces such as wing flaps or ailerons or vertical fins or rudders. Aircraft control surfaces, however, are somewhat limited in their effectiveness because of large differences in operational flight conditions such as air speed. Aircraft control surfaces also increase an aircraft's radar signature making it more vulnerable to anti-aircraft fire and missile. Thrust vectoring nozzles, though often more complicated, are more effective because they allow large thrust loads to be quickly applied in the pitch and yaw direction of the aircraft, thereby, providing the aircraft with enhanced maneuverability which is relatively independent of air speed. Thrust vectoring nozzles are complex, heavy, and expensive. Other thrust vectoring methods include use of nozzle internal fluidic injection and/or mechanical flow diversion devices to skew the thrust. These thrust vectoring methods are effective but may be complex, heavy, costly and/or marginally effective.

It is, thus, highly desirable to provide an aircraft gas turbine engine with a thrust vectoring nozzle that is not complex, nor heavy, nor expensive, and yet, very effective for thrust vectoring.

SUMMARY OF THE INVENTION

A vectorable nozzle for use with an aircraft gas turbine engine includes a longitudinally extending upper fixed wall spaced upwardly and aftwardly of a longitudinally extending lower fixed wall and an aftwardly swept fixed ramp extending between the upper and lower fixed walls. The upper and lower fixed walls and the fixed ramp extend transversely between first and second fixed sidewalls. An outer nozzle wall is spaced apart from the upper and lower fixed walls and extends transversely between first and second fixed sidewalls. A nozzle flowpath is defined between the upper and lower fixed walls and the outer nozzle wall and the first and second fixed sidewalls. A sideways pivotable ramp structure pivotally connected to the lower fixed wall and pivotable between the sidewalls includes a longitudinally extending upper pivotable wall spaced upwardly and aftwardly of a longitudinally extending lower pivotable wall and an aftwardly swept pivotable ramp extending between the upper and lower pivotable walls.

In an exemplary embodiment of the vectorable nozzle, the upper pivotable wall includes a widthwise aftwardly tapered section which may have an isosceles triangular planform area including side edges extending equi-angularly aftwardly from a base line between the tapered section and a non-tapered section of the upper pivotable wall. Taper angles between the side edges and the base line may be sized for allowing the side edges to substantially abut respective ones of the sidewalls when the pivotable ramp structure is pivoted sideways.

A fin may be attached to the pivotable ramp structure along at least longitudinally extending first and second portions of the lower pivotable wall and the pivotable ramp respectively, and may extend longitudinally over a pivot point where the ramp structure is pivotally connected to the lower fixed wall.

A more particular embodiment of the vectorable nozzle includes a widthwise aftwardly tapered section of the upper pivotable wall and a base line between the tapered section and a non-tapered section of the upper pivotable wall. A throat extends substantially downward across the nozzle flowpath from the outer nozzle wall to the ramp structure, and the tapered and non-tapered sections are contoured so that the throat extends widthwise substantially along the base line during vectored and unvectored operation of the nozzle.

Another more particular embodiment of the vectorable nozzle includes an upper triangular surface of the upper fixed wall bounding nozzle flowpath and at least a portion of the upper triangular surface extending aftwardly of the first and second fixed sidewalls to an apex of the triangular surface.

DETAILED DESCRIPTION OF THE INVENTION

Figure 1:
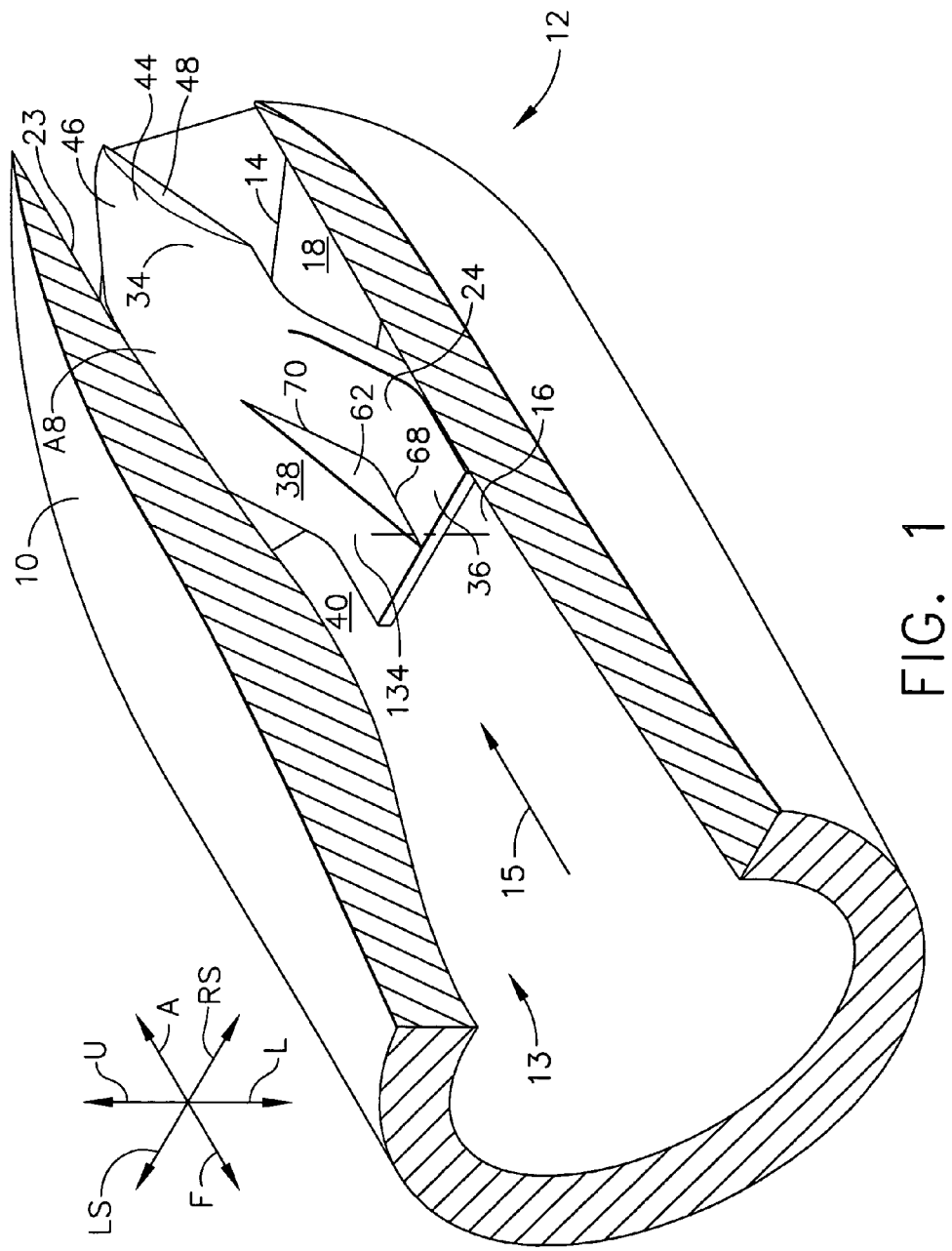
FIG. 1 is a partially cut-away perspective view illustration of a vectorable nozzle with a sideways pivotable ramp.
Figure 2:
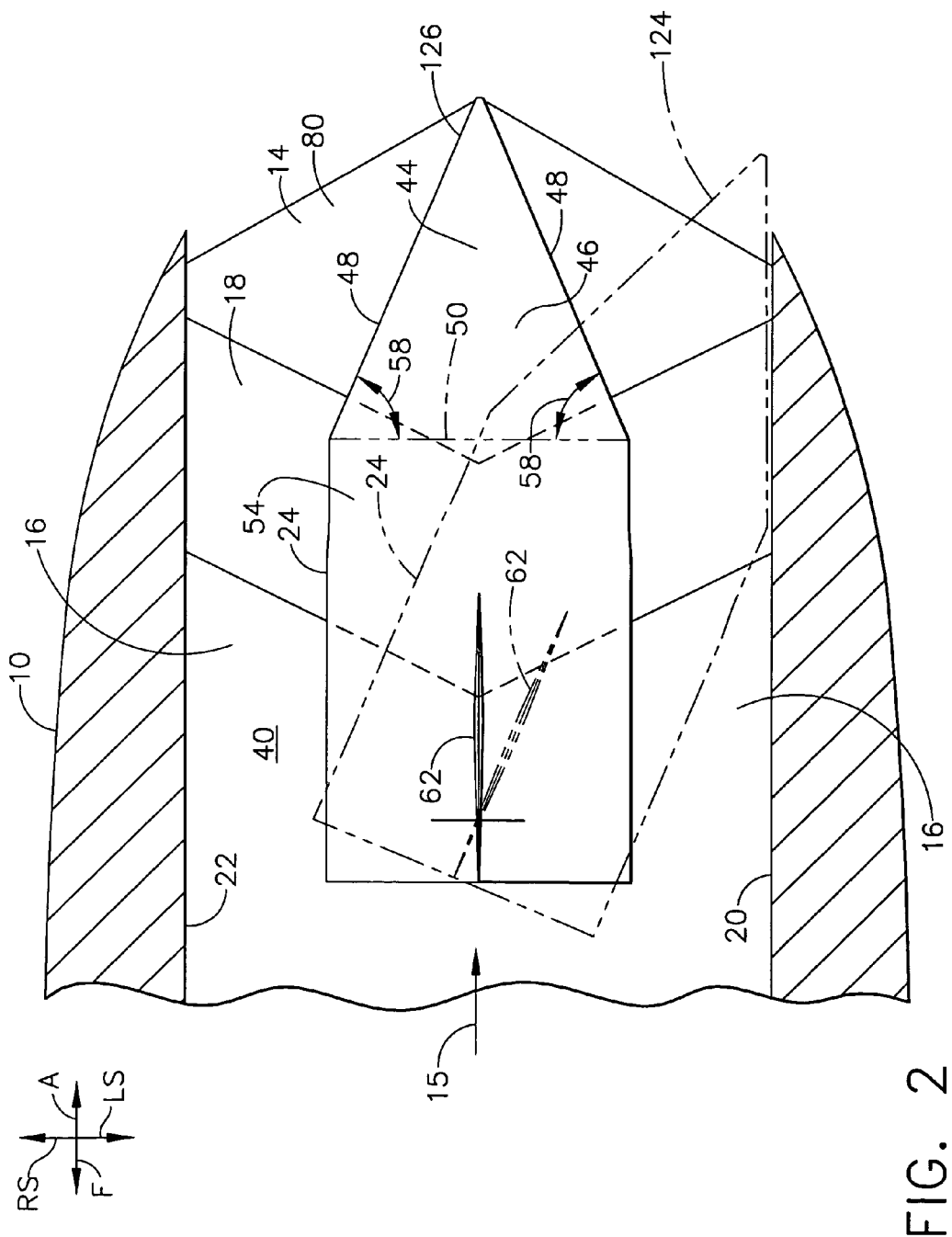
FIG. 2 is a cross-section top looking down view illustration of the vectorable nozzle in FIG. 1.

Illustrated in FIGS. 1 and 2 is an exemplary embodiment of a vectorable nozzle 12 designed to vector exhaust flow 15 sideways. The vectorable nozzle 12 includes an outer casing 10 which is connected to an aft end of an aircraft gas turbine engine (not shown) by a transition duct 13. The transition duct 13 converts the exhaust flow 15 from one with a circular cross-section or axisymmetric exhaust flow 15 to one having a rectangular cross-section or two-dimensional (2D) exhaust flow 15. At this point, it is important to define the conventions used to describe the directions and frame of references for the flow, the movement of various nozzle elements. Forward and aft directions F and A are illustrated in FIG. 1 by respective arrows. Left and right sideway LS and RS directions are illustrated in FIG. 1 by respective arrows from a frame of reference forward looking aft. Upper and lower directions U and L are illustrated in FIG. 1 by respective arrows. Upper and lower elements and right and left elements are used only for describing the nozzle within the illustrated reference frame.

Figure 6:
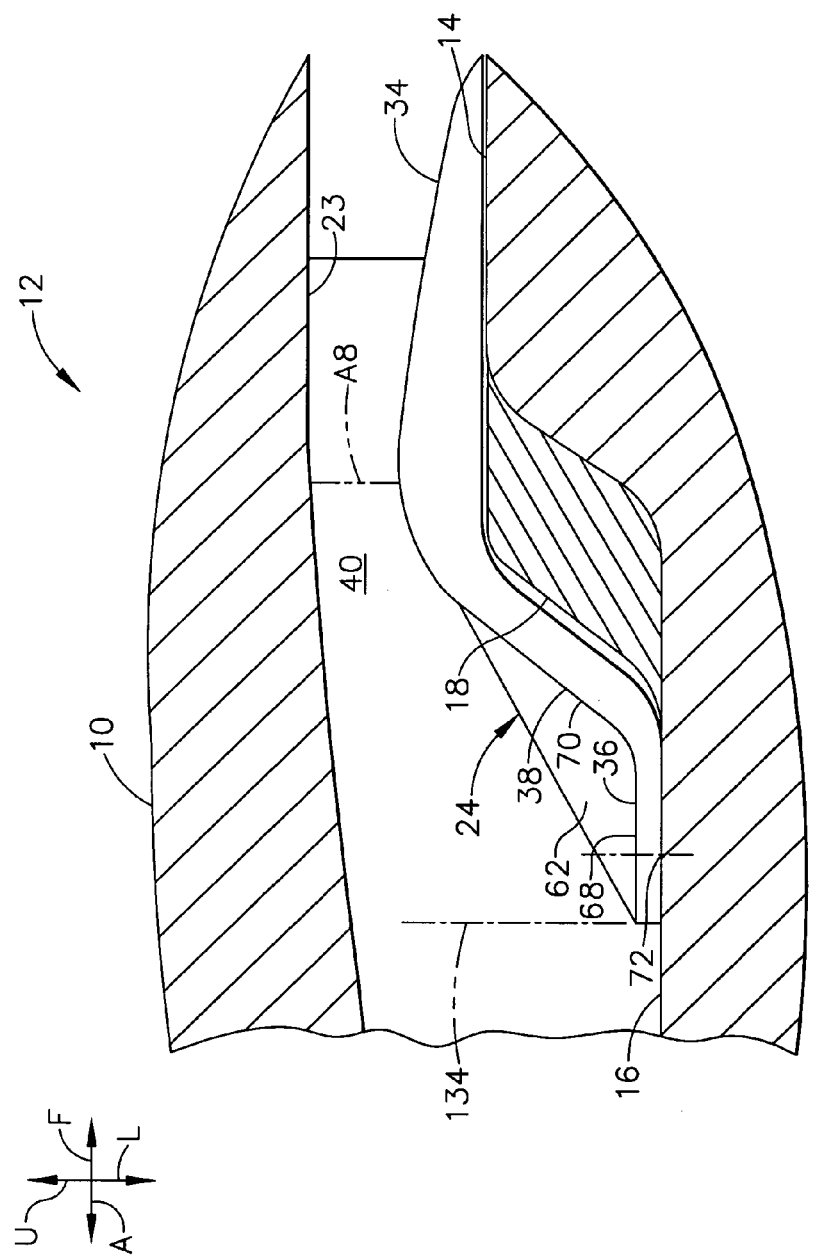
FIG. 6 is a cross-section side view illustration of the vectorable nozzle in FIG. 1.

Referring to FIGS. 1 and 6, the vectorable nozzle 12 includes a longitudinally extending upper fixed wall 14 spaced upwardly and aftwardly of a longitudinally extending lower fixed wall 16 and an aftwardly swept fixed ramp 18 extending between the upper and lower fixed walls 14 and 16. The upper and lower fixed walls 14 and 16 and the fixed ramp 18 extend transversely between first and second fixed sidewalls 20 and 22. An outer nozzle wall 23 is spaced apart from the upper and lower fixed walls 14 and 16 and extends transversely between first and second fixed sidewalls 20 and 22. A nozzle flowpath 40 is defined between the upper and lower fixed walls 14 and 16 and the outer nozzle wall 23 and the first and second fixed sidewalls 20 and 22.

A sideways pivotable ramp structure 24 is pivotally connected to the lower fixed wall 16 and is sideways pivotable between the sidewalls 20 and 22. The pivotable ramp structure 24 includes a longitudinally extending upper pivotable wall 34 spaced upwardly and aftwardly of a longitudinally extending lower pivotable wall 36 and an aftwardly swept pivotable ramp 38 extending between the upper and lower pivotable walls 34 and 36. The sideways pivotable ramp structure 24 may also be described as being sideways pivotable within the outer casing 10, particularly, if there are no clearly definable or identifiable sidewalls 20 and 22 such as in the case of smoothed curved continuous outer nozzle wall 23 extending around to the upper and lower fixed walls 14 and 16.

The upper pivotable wall 34 includes a widthwise aftwardly tapered section 44 illustrated as having an isosceles triangular planform area 46. The aftwardly tapered section 44 includes side edges 48 extending equi-angularly aftwardly from a base line 50 between the tapered section 44 and a non-tapered section 54 (illustrated as being rectangular) of the upper pivotable wall 34. Taper angles 58 between the side edges 48 and the base line 50 are sized for allowing the side edges 48 to substantially abut respective ones of the sidewalls 20 and 22 when the pivotable ramp structure 24 is pivoted sideways.

An upper triangular surface 80 of the upper fixed wall 14 bounds nozzle flowpath 40. At least a portion of the upper triangular surface 80 extends aftwardly of the first and second fixed sidewalls 20 and 22 to an apex 82 of the triangular surface 80. The upper triangular surface 80 extending aftwardly past the first and second fixed sidewalls 20 and 22 and the outer casing 10 allows vectoring of the exhaust flow 15 by allowing it to expand in the left and right sideway directions LS and RS respectively aftward of the outer casing 10.

A fin 62 attached to the pivotable ramp structure 24 along at least longitudinally extending first and second portions 68 and 70 of the lower pivotable wall 36 and the pivotable ramp 38 respectively provides aerodynamically self-centering the pivotable ramp 38 which is particularly desirable if a failure of an actuation system for pivoting the pivotable ramp should occur. The fin 62 extends longitudinally over a pivot point 72 (illustrated in FIG. 6). The ramp structure 24 is pivotally connected to the lower fixed wall 16 at the pivot point 72.

Figure 3:
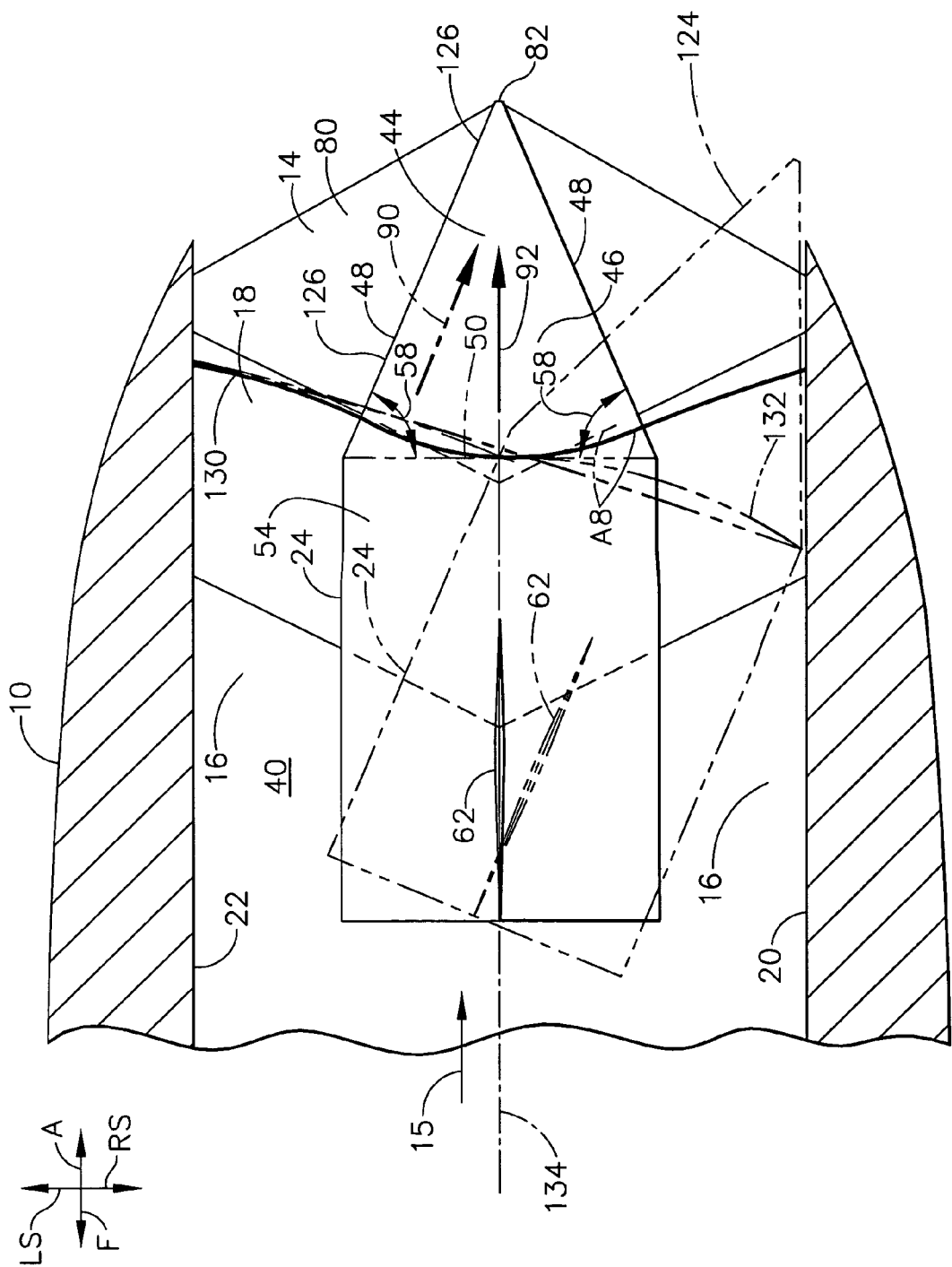
FIG. 3 is a cross-section top looking down view illustration of the vectorable nozzle in FIG. 1 with throat locations illustrated therein.

A throat A8, illustrated in FIGS. 3 and 6, of the nozzle 12 extends substantially downward across the nozzle flowpath 40 from the outer nozzle wall 23 to the ramp structure 24. A center plane 134 passes through the fin 62 when the ramp structure 24 is in the non-pivoted position 126. The tapered and non-tapered sections 44 and 54 are contoured so that the throat A8 extends widthwise substantially along the base line 50 during vectored and unvectored operation of the nozzle 12. During unvectored operation of the nozzle 12, the ramp structure 24 is pivoted fully or partially sideways. FIG. 2 illustrates the ramp structure 24 in a fully sideways pivoted position 124 illustrated in phantom line as compared to a non-pivoted position 126.

FIG. 3 illustrates the exhaust flow 15 vectored sideways forming a sideways vectored nozzle exit flow 90 as compared to an unvectored nozzle exit flow 92 corresponding to the ramp structure 24 in a fully sideways pivoted position 124 and the non-pivoted position 126, respectively. The throat A8 has a substantially symmetric shape 130 about the center plane 134 when the ramp structure 24 is in the non-pivoted position 126 and asymmetric shape 132 about the center plane 134 when the ramp structure 24 is in a vectored position illustrated by the fully sideways pivoted position 124.

Figure 4:
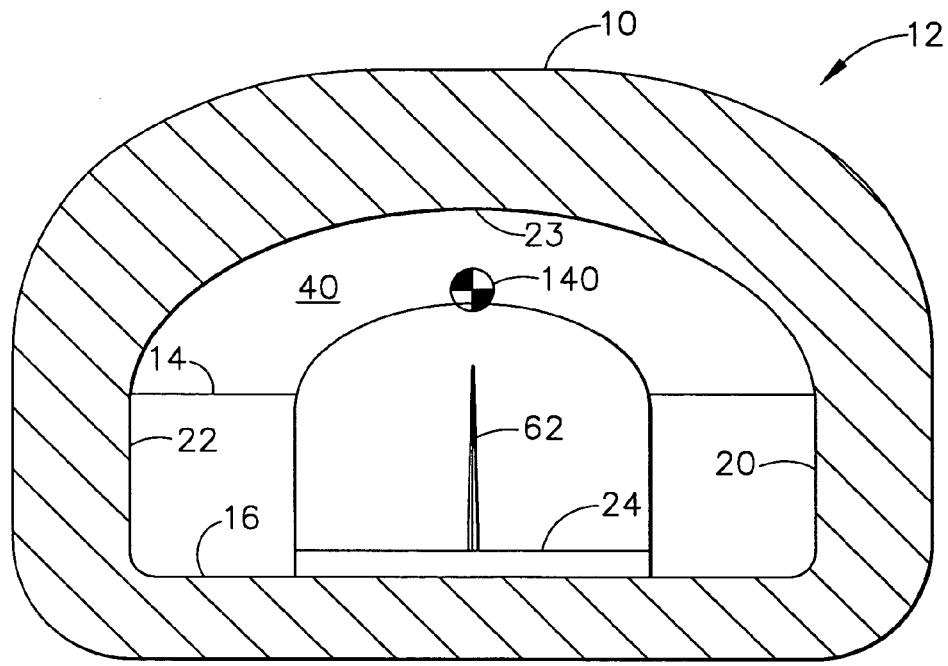
FIG. 4 is a cross-section forward looking aft view illustration of the vectorable nozzle in FIG. 1 with the pivotable ramp not pivoted.
Figure 5:
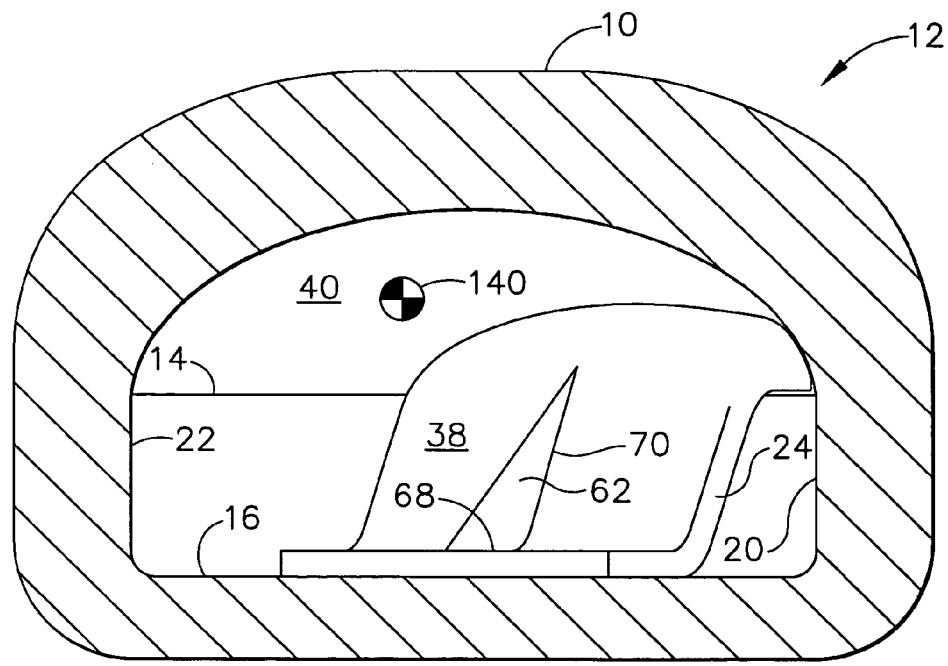
FIG. 5 is a cross-section forward looking aft view illustration of the vectorable nozzle in FIG. 1 with the pivotable ramp fully pivoted.

The vectorable nozzle 12 vectors the thrust by simultaneously shifting the exhaust flow 15 advantageously sideways for vectoring and skewing the exhaust flow 15 flow at the throat A8. FIG. 4 illustrates a center 140 of the exhaust flow 15 centered sideways when the ramp structure 24 is in the non-pivoted position 126 and the thrust and exhaust flow 15 are not vectored. FIG. 5 illustrates the center 140 of the exhaust flow 15 shifted sideways when the ramp structure 24 is in the fully sideways pivoted position 124 and the thrust and exhaust flow 15 are vectored.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. A vectorable nozzle comprising:

a longitudinally extending upper fixed wall spaced upwardly and aftwardly of a longitudinally extending lower fixed wall, an aftwardly swept fixed ramp extending between the upper and lower fixed walls, the upper and lower fixed walls and the fixed ramp extending transversely between first and second fixed sidewalls, an outer nozzle wall spaced apart from the upper and lower fixed walls, extending transversely between first and second fixed sidewalls, a nozzle flowpath defined between the upper and lower fixed walls and the outer nozzle wall and the first and second fixed sidewalls, a sideways pivotable ramp structure pivotally connected to the lower fixed wall and pivotable between the sidewalls, and the pivotable ramp structure including a longitudinally extending upper pivotable wall spaced upwardly and aftwardly of a longitudinally extending lower pivotable wall and an aftwardly swept pivotable ramp extending between the upper and lower pivotable walls.

2. A vectorable nozzle as claimed in claim 1 further comprising the upper pivotable wall including a widthwise aftwardly tapered section.

3. A vectorable nozzle as claimed in claim 2 further comprising the tapered section having an isosceles triangular planform area including side edges extending equi-angularly aftwardly from a base line between the tapered section and a non-tapered section of the upper pivotable wall.

4. A vectorable nozzle as claimed in claim 3 further comprising taper angles between the side edges and the base line and the taper angles sized for allowing the side edges to substantially abut respective ones of the sidewalls when the pivotable ramp structure is pivoted sideways.

5. A vectorable nozzle as claimed in claim 4 further comprising a fin attached to the pivotable ramp structure.

6. A vectorable nozzle as claimed in claim 5 further comprising the fin being attached to the pivotable ramp structure along at least longitudinally extending first and second portions of the lower pivotable wall and the pivotable ramp respectively.

7. A vectorable nozzle as claimed in claim 6 further comprising the fin extending longitudinally over a pivot point where the ramp structure is pivotally connected to the lower fixed wall.

8. A vectorable nozzle as claimed in claim 2 further comprising:
the upper pivotable wall including a widthwise aftwardly tapered section and a base line between the tapered section and a non-tapered section of the upper pivotable wall,
a throat extending substantially downward across the nozzle flowpath from the outer nozzle wall to the ramp structure, and
the tapered and non-tapered sections of the upper pivotable wall being contoured so that the throat extends widthwise substantially along the base line during vectored and unvectored operation of the nozzle.

9. A vectorable nozzle as claimed in claim 8 further comprising the tapered section having an isosceles triangular planform area including side edges extending equi-angularly aftwardly from the base line between the tapered and the non-tapered sections of the upper pivotable wall.

10. A vectorable nozzle as claimed in claim 9 further comprising taper angles between the side edges and the base line and the taper angles sized for allowing the side edges to substantially abut respective ones of the sidewalls when the pivotable ramp structure is pivoted sideways.

11. A vectorable nozzle as claimed in claim 10 further comprising a fin attached to the pivotable ramp structure.

12. A vectorable nozzle as claimed in claim 11 further comprising the fin being attached to the pivotable ramp structure along at least longitudinally extending first and second portions of the lower pivotable wall and the pivotable ramp respectively.

13. A vectorable nozzle as claimed in claim 12 further comprising the fin extending longitudinally over a pivot point where the ramp structure is pivotally connected to the lower fixed wall.

14. A vectorable nozzle as claimed in claim 1 further comprising an upper triangular surface of the upper fixed wall bounding nozzle flowpath and at least a portion of the upper triangular surface extending aftwardly of the first and second fixed sidewalls to an apex of the triangular surface.

15. A vectorable nozzle as claimed in claim 14 further comprising the upper pivotable wall including a widthwise aftwardly tapered section.

16. A vectorable nozzle as claimed in claim 15 further comprising the tapered section having an isosceles triangular planform area including side edges extending equi-angularly aftwardly from a base line between the tapered section and a non-tapered section of the upper pivotable wall.

17. A vectorable nozzle as claimed in claim 16 further comprising taper angles between the side edges and the base line and the taper angles sized for allowing the side edges to substantially abut respective ones of the sidewalls when the pivotable ramp structure is pivoted sideways.

18. A vectorable nozzle as claimed in claim 17 further comprising a fin attached to the pivotable ramp structure.

19. A vectorable nozzle as claimed in claim 18 further comprising the fin being attached to the pivotable ramp structure along at least longitudinally extending first and second portions of the lower pivotable wall and the pivotable ramp respectively.

20. A vectorable nozzle as claimed in claim 19 further comprising the fin extending longitudinally over a pivot point where the ramp structure is pivotally connected to the lower fixed wall.

21. A vectorable nozzle as claimed in claim 15 further comprising:
the upper pivotable wall including a widthwise aftwardly tapered section and a base line between the tapered section and a non-tapered section of the upper pivotable wall,
a throat extending substantially downward across the nozzle flowpath from the outer nozzle wall to the ramp structure, and
the tapered and non-tapered sections of the upper pivotable wall being contoured so that the throat extends widthwise substantially along the base line during vectored and unvectored operation of the nozzle.

22. A vectorable nozzle as claimed in claim 21 further comprising the tapered section having an isosceles triangular planform area including side edges extending equi-angularly aftwardly from the base line between the tapered and the non-tapered sections of the upper pivotable wall.

23. A vectorable nozzle as claimed in claim 22 further comprising taper angles between the side edges and the base line and the taper angles sized for allowing the side edges to substantially abut respective ones of the sidewalls when the pivotable ramp structure is pivoted sideways.

24. A vectorable nozzle as claimed in claim 23 further comprising a fin attached to the pivotable ramp structure.

25. A vectorable nozzle as claimed in claim 24 further comprising the fin being attached to the pivotable ramp structure along at least longitudinally extending first and second portions of the lower pivotable wall and the pivotable ramp respectively.

26. A vectorable nozzle as claimed in claim 25 further comprising the fin extending longitudinally over a pivot point where the ramp structure is pivotally connected to the lower fixed wall.

* * * * *